//www.hendersonfarabow.com/US007341614B2

United States Patent
Hayashi et al.

(10) Patent No.: US 7,341,614 B2
(45) Date of Patent: Mar. 11, 2008

(54) FILTER AND FILTER ASSEMBLY

(75) Inventors: Masayuki Hayashi, Gifu (JP); Kazutake Ogyu, Gifu (JP); Akihiro Ohira, Gifu (JP); Kazushige Ohno, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 0 days.

(21) Appl. No.: 11/487,328

(22) Filed: Jul. 17, 2006

(65) Prior Publication Data
US 2006/0254231 A1 Nov. 16, 2006

Related U.S. Application Data

(63) Continuation of application No. PCT/JP2005/014861, filed on Aug. 8, 2005, now abandoned.

(30) Foreign Application Priority Data
Dec. 28, 2004 (JP) ............... 2004-382132

(51) Int. Cl.
*B01D 46/00* (2006.01)
*F01N 3/022* (2006.01)

(52) U.S. Cl. ............... 55/523; 55/282.2; 55/282.3; 55/385.3; 55/484; 55/524; 55/DIG. 10; 55/DIG. 30; 60/297; 60/299; 60/311

(58) Field of Classification Search ............... 55/282.2, 55/282.3, 385.3, 482, 484, 523, 524, DIG. 10, 55/DIG. 30; 60/297, 299, 300, 303, 311
See application file for complete search history.

(56) References Cited

U.S. PATENT DOCUMENTS

| 4,632,683 | A | * | 12/1986 | Fukutani et al. ............... 55/523 |
| 5,545,243 | A | * | 8/1996 | Kotani et al. ............... 55/523 |
| 5,914,187 | A | * | 6/1999 | Naruse et al. ............... 55/523 |
| 6,541,407 | B2 | * | 4/2003 | Beall et al. ............... 55/523 |
| 6,773,481 | B2 | * | 8/2004 | Noguchi et al. ............... 55/523 |
| 6,814,774 | B2 | * | 11/2004 | Ishihara et al. ............... 55/523 |
| 6,818,580 | B2 | * | 11/2004 | Kumazawa et al. ............... 55/523 |
| 7,141,089 | B2 | * | 11/2006 | Beall et al. ............... 55/523 |
| 7,179,316 | B2 | * | 2/2007 | Merkel et al. ............... 55/523 |

FOREIGN PATENT DOCUMENTS

| JP | 2000-128656 | 5/2000 |
| JP | 2001-269522 | 10/2001 |
| JP | 2002-355511 | 12/2002 |
| JP | 2003-120256 | 4/2003 |
| JP | 2004-076717 | 3/2004 |

OTHER PUBLICATIONS

International Bureau, ITEC International Patent Firm, Notification of Transmittal of Copies of Translation of the International Preliminary Report on Patentability, mailed Jul. 12, 2007.

* cited by examiner

*Primary Examiner*—Jason M. Greene
(74) *Attorney, Agent, or Firm*—Finnegan Henderson Farabow Garrett & Dunner LLP

(57) ABSTRACT

The invention provides a filter that has a plurality of through holes and satisfies the expression $2.5 \times A/B + 52.5 \leq C \leq 2.5 \times A/B + 60.2$ ($A \leq 20$, $0 < B \leq 20$), where $A(\%)$ represents the ratio of pores with a pore diameter of 10 μm or less to the total pore volume in a wall part between the through holes; $B(\%)$ represents the ratio of pores with a pore diameter of 30 μm or more to the total pore volume in the wall part; and $C(\%)$ represents the aperture ratio of a plane perpendicular to the through holes.

18 Claims, 6 Drawing Sheets

(a)

(b)

FILTER AND FILTER ASSEMBLY

CROSS REFERENCE TO THE RELATED APPLICATIONS

The present invention is a continuation of International Application No PCT/JP2005/014861, filed on Aug. 8, 2005 and now abandoned, which claims priority from Japanese Patent Application No. 2004-382132 filed on Dec. 28, 2004.

BACKGROUND ART

1. Field of the Invention

The present invention relates to a filter and a filter assembly.

2. Description of the Related Art

There has conventionally been proposed a filter created with the thickness of the wall part between through holes based on pore distribution. For example, the filter described in JP-A 2001-269522 is adapted to have a wall thickness T of 100 μm or more when P1 is 10%, while a wall thickness T of 300 μm or more when P1 is 30%, that is, to satisfy P1×10≦T, where P1 represents the ratio of pores with a pore diameter of 30 μm or more to the total pore volume while T represents the wall thickness. The filter is also adapted to have a wall thickness T of 150 μm or less when P3 is 10%, while a wall thickness T of 50 μm or less when P3 is 30%, that is, to satisfy (1/P3)×1500≧T, where P3 represents the ratio of pores with a pore diameter of less than 3 μm to the total pore volume while T represents the wall thickness. Thus, the prior arts mention that, in a filter including many pores with a large pore diameter, the wall thickness is increased to improve the filtering efficiency against particulate materials, while including many pores with a small pore diameter, the wall thickness is decreased to reduce pressure loss.

SUMMARY OF THE INVENTION

The present invention is directed to a filter that has a plurality of through holes and satisfies the expression 2.5×A/B+52.5≦C≦2.5×A/B+60.2 (A≦about 20, 0<B≦about 20), where A(%) represents the ratio of pores with a pore diameter of about 10 μm or less to the total pore volume in a wall part between the through holes; B(%) represents the ratio of pores with a pore diameter of about 30 μm or more to the total pore volume in the wall part; and C(%) represents the aperture ratio of a plane perpendicular to the through holes.

The present invention is also directed to another filter that has a plurality of throughholes and a wall part which supports a catalyst between the through holes. The filter satisfies the expression 2.5×A/B+52.5≦C≦2.5×A/B+60.2 (A≦about 20, 0<B≦about 20), where A(%) represents the ratio of pores with a pore diameter of about 10 μm or less to the total pore volume in the wall part; B (%) represents the ratio of pores with a pore diameter of about 30 μm or more to the total pore volume in the wall part; and C(%) represents the aperture ratio of a plane perpendicular to the through holes.

The filters of the invention may further satisfy the expression 2.5×A/B+55.5≦C.

The filters of the invention may further satisfy the expression C≦2.5×A/B+58.0.

In the filters of the invention, the aperture ratio is preferably about 58% or more. And the aperture ratio is preferably about 75% or less.

In the filters of the invention, the wall thickness between the through holes is preferably within a range of about 0.15 to about 0.40 mm.

In the filters of the invention, the cell density is preferably within a range of about 31 to about 78 pcs/cm$^2$.

The filters of the invention preferably included any of silicon carbide, silicon nitride, and cordierite, as a main component.

The present invention is further directed to a filter assembly in which two or more filters are joined to each other via a sealing material layer on the outer surface thereof with no throughholes opened. In the filter assembly, each of the filters has a plurality of through holes and satisfies the expression 2.5×A/B+52.5≦C≦2.5×A/B+60.2 (A≦about 20, 0<B≦about 20), where A(%) represents the ratio of pores with a pore diameter of about 10 μm or less to the total pore volume in a wall part between the through holes; B(%) represents the ratio of pores with a pore diameter of about 30 μm or more to the total pore volume in the wall part; and C(%) represents the aperture ratio of a plane perpendicular to the through holes.

The present invention is further directed to another filter assembly in which two or more filters are joined to each other via a sealing material layer on the outer surface thereof with no through holes opened. In the filter assembly, each of the filters has a plurality of through holes and a wall part that supports a catalyst between the through holes, and satisfies the expression 2.5×A/B+52.5≦C≦2.5×A/B+60.2 (A≦about 20, 0<B≦about 20), where A(%) represents the ratio of pores with a pore diameter of about 10 μm or less to the total pore volume in the wall part; B (%) represents the ratio of pores with a pore diameter of about 30 μm or more to the total pore volume in the wall part; and C(%) represents the aperture ratio of a plane perpendicular to the through holes.

The filter included in the filter assembly of the invention may further have any of the characteristics described above in connection with the filter of the invention.

BEST MODES FOR CARRYING OUT THE INVENTION

Figure 1:
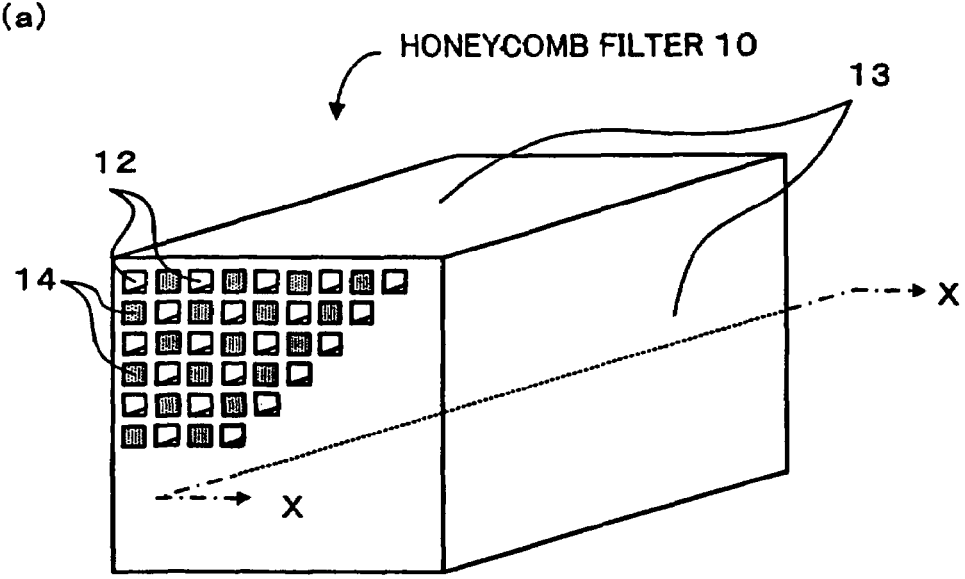
FIG. 1 is an illustrative view of a honeycomb filter 10 according to the present embodiment.
Figure 1:
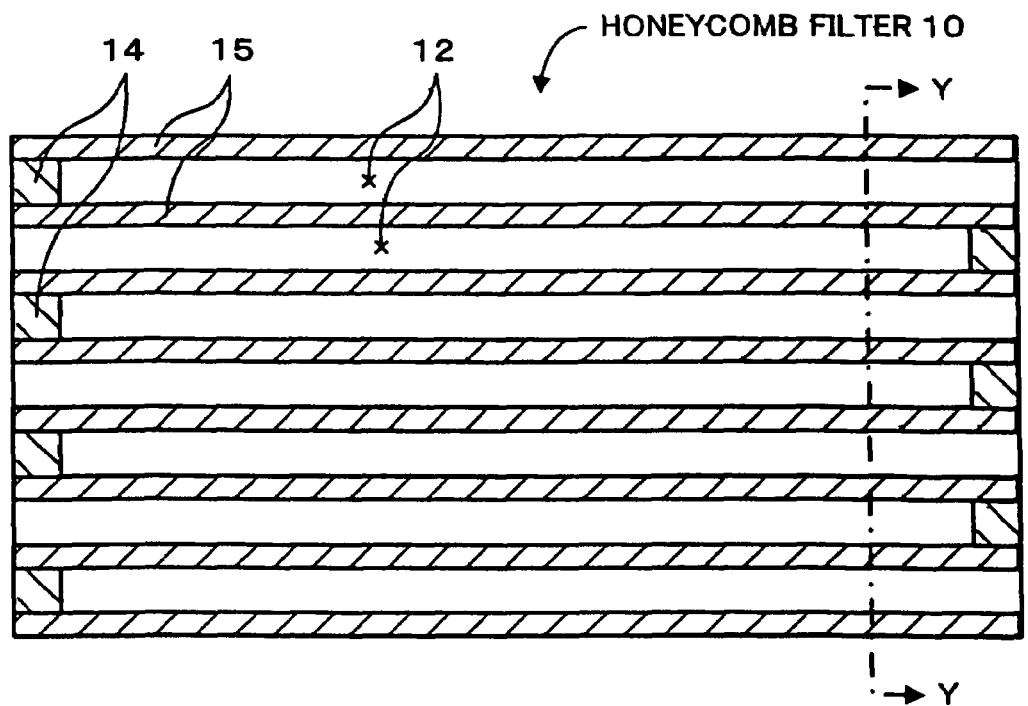

One embodiment of the present invention provides a filter having a plurality of through holes, the filter satisfying the expression 2.5×A/B+52.5≦C≦2.5×A/B+60.2 (A≦about 20, 0<B≦about 20), where A(%) represents the ratio of pores with a pore diameter of about 10 μm or less to the total pore volume in a wall part between the through holes; B(%) represents the ratio of pores with a pore diameter of about 30

μm or more to the total pore volume in the wall part; and C(%) represents the aperture ratio of the plane perpendicular to the through holes.

In a filter of this kind, through holes may generally be sealed at one end portion thereof through which fluid (e.g. gas, liquid) flows into or out, and the wall part separating these through holes functions as a filter. That is, fluid that flows into a through hole passes through the wall part, and then flows out through another through hole. In this case, particulate materials contained in the fluid, for example, are removed by the wall part. Here, the pressure loss, which varies depending on the resistance when fluid flows into/out of the filter or when passes through the wall part, is considered to be impacted by the aperture ratio of the filter and/or the pore distribution in the wall part, etc. Also, the filtering efficiency against particulate materials, which varies depending on the difficulty for particulate materials to pass through the wall part, is considered to be impacted by the aperture ratio of the filter and/or the pore distribution in the wall part, etc. Focusing on the relationship between the aperture ratio of a filter and the ratio of pores with a predetermined pore diameter to the total pore volume as the pore distribution in the wall part, the present inventors have applied themselves to their studies and consequently found that satisfying the expression $2.5 \times A/B + 52.5 \leq C \leq 2.5 \times A/B + 60.2$ ($A \leq$ about 20, $0 < B \leq$ about 20), where A(%) represents the ratio of pores with a pore diameter of about 10 μm or less to the total pore volume in the wall part; B(%) represents the ratio of pores with a pore diameter of about 30 μm or more to the total pore volume in the wall part; and C(%) represents the aperture ratio of the plane perpendicular to the through holes, can reduce pressure loss as well as filter particulate materials sufficiently, resulting in completion of the present invention.

Another embodiment of the present invention provides a filter having a plurality of through holes, wherein the wall part between the through holes supports a catalyst, the filter satisfying the expression $2.5 \times A/B + 52.5 \leq C \leq 2.5 \times A/B + 60.2$ ($A \leq$ about 20, $0 < B \leq$ about 20), where A(%) represents the ratio of pores with a pore diameter of about 10 μm or less to the total pore volume in the wall part; B(%) represents the ratio of pores with a pore diameter of about 30 μm or more to the total pore volume in the wall part; and C (%) represents the aperture ratio of the plane perpendicular to the through holes.

Also in accordance with the filter above, since the foregoing formula is to be satisfied after supporting the catalyst, it is possible to reduce pressure loss as well as filter particulate materials sufficiently. Here, the catalyst may be one for helping the burning of particulate materials contained in exhaust gas or for converting CO, HC, NOx, etc., in exhaust gas, for example, precious metals, alkali metals, alkaline-earth metals, or oxide. As such precious metals one or more kinds selected among, for example, platinum, palladium, and rhodium can be used; as such alkali metals one or more kinds selected among, for example, sodium and potassium can be used; and as such alkaline-earth metals one or more kinds selected among, for example, magnesium and barium can be used. Also, as such oxides one or more kinds selected among, for example, compounds having a perovskite structure (e.g. $LaCoO_3$, $LaMnO_3$) and $CeO_2$ can be used. As such oxides having a perovskite structure, for example, compounds in which the A-site of the perovskite structure (with a general formula of $ABO_3$) has one or more kinds of elements selected among, for example, La, Y, and Ce, where it is preferable to select La, while the B-site of the general formula has one, two or more elements selected among, for example, Fe, Co, Ni, and Mn can be used. It is noted that the element of the A-site may be replaced partially with K, Sr, or Ag, etc., to be $La_{0.75}K_{0.25}CoO_3$, for example.

The filter according to the embodiments may preferably further satisfy $2.5 \times A/B + 55.5 \leq C$. This can further reduce pressure loss.

The filter according to the embodiments may preferably further satisfy $C \leq 2.5 \times A/B + 58.0$. This can further improve the filtering efficiency against particulate materials.

In the filter according to the embodiments, the aperture ratio may preferably be about 58% or more. When the aperture ratio is about 58% or more, the pressure loss does not increase relatively.

In the filter according to the embodiments, the aperture ratio may preferably be about 75% or less. When the aperture ratio is about 75% or less, the amount of the base material forming the wall does not decrease and strength of the filter is adequately maintained.

In the filter according to the embodiments, the wall thickness between the through holes may preferably be about 0.15 to about 0.40 mm. When the wall thickness is about 0.15 mm or more, the strength is mainained, while when the wall thickness is about 0.40 mm or less, exhaust gas easily passes through the wall and the pressure loss is not easily increased.

In the filter according to the embodiments, the cell density may preferably be about 31 to about 78 pcs/cm². When the cell density is about 31 pcs/cm² or more, the area (filtration area) in the wall through which exhaust gas passes or with which exhaust gas is brought into contact is not decreased, while when the wall density is about 78 pcs/cm² or less, the pressure loss is not easily increased.

The filter according to the embodiments may preferably includes, as a main component, one or more kinds selected among, for example, silicon carbide, silicon nitride, silica, alumina, zirconia, titania, ceria, mullite, cordierite, and aluminum titanate, where it is more preferable to select silicon carbide. This is for the reason that silicon carbide has a desirable characteristic such as thermal conductivity as a filter for filtering and burning particulate materials in exhaust gas.

Another embodiment of the present invention provides a filter assembly in which two or more filters (any of the foregoing filters) are joined via a sealing material layer on the outer surface thereof with no such through holes opened therein.

In accordance with the filter assembly above, it is possible to increase the strength against thermal shock and vibration. This is considered for the reason that since the sealing material layer exists on the outer periphery of the filter, the sealing material layer can absorb thermal shock and vibration.

Next, described is best mode for carrying out the present invention with reference to the accompanying drawings.

First, described a filter according to the present embodiment. FIG. 1 is an illustrative view of a honeycomb filter 10 according to the present embodiment, where FIG. 1(a) shows a perspective view and FIG. 1(b) shows a cross-sectional view along the line X-X in FIG. 1(a). The honeycomb filter 10 is constructed as a diesel particulate filter having a function of filtering, burning, and thereby cleaning up particulate materials (hereinafter referred to as PM) contained in exhaust gas from a diesel engine. The honeycomb filter 10 has a plurality of through holes 12 extending in parallel longitudinally. The end face of the through holes 12 is sealed alternately using a plugging part 14. Therefore, in the honeycomb filter 10, exhaust gas that flows into through the inlet of a through hole 12 passes through the wall part 15 to be distributed into the adjacent through hole 12, and in this case PMs contained in the exhaust gas are to be trapped by the wall part 15 of the honeycomb filter 10. In the wall part 15 of the honeycomb filter 10 is also formed a coated layer with a catalyst support coated thereon, the coated layer supporting a catalyst.

Figure 2:
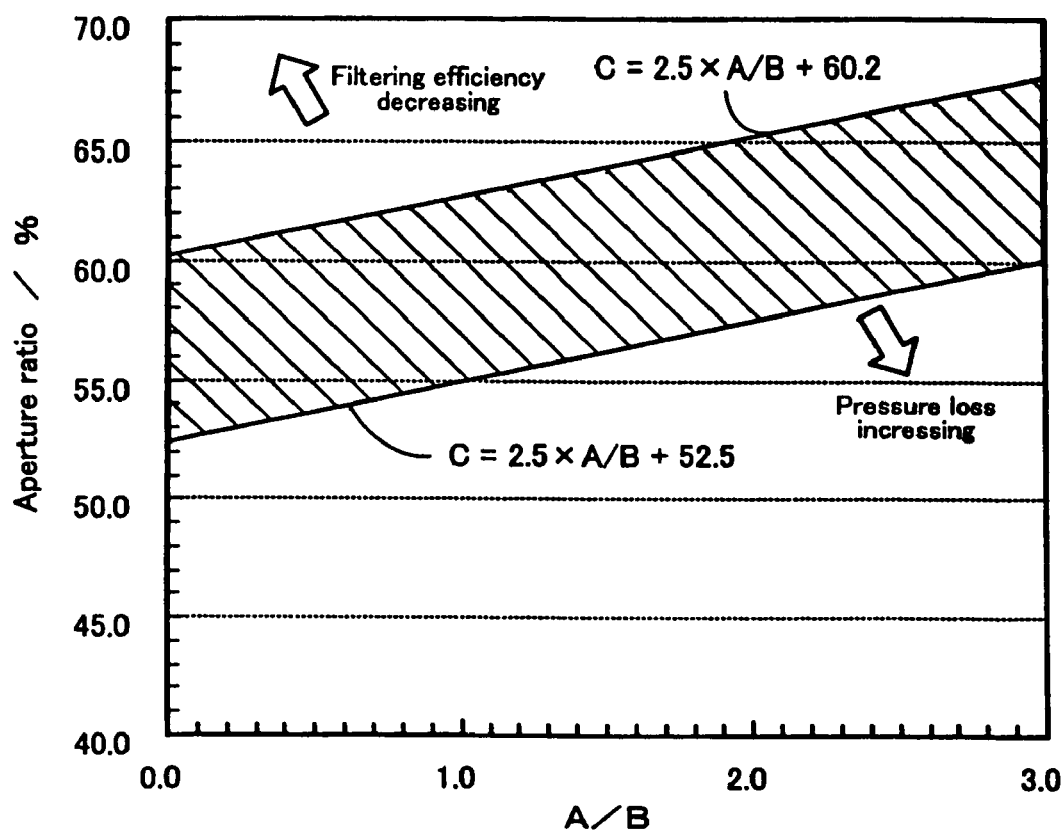
FIG. 2 is a graph showing a preferred range for the A/B value and the aperture ratio.

The honeycomb filter 10 satisfies $2.5 \times A/B + 52.5 \leq C \leq 2.5 \times A/B + 60.2$ ($A \leq$ about 20, $0 < B \leq$ about 20); Formula (1), where A % represents the ratio of pores with a pore diameter of about 10 μm or less to the total pore volume in the wall part 15 (hereinafter referred to as "ratio A"); B % represents the ratio of pores with a pore diameter of about 30 μm or more to the total pore volume in the wall part 15 (hereinafter referred to as "ratio B"); and C % represents the aperture ratio of the plane in the honeycomb filter 10 perpendicular to the through holes 12 (hereinafter referred to as "aperture ratio C"). The aperture ratio C here means the aperture ratio of the plane with no plugging part 14 formed therein (cross section Y-Y in FIG. 1(b)). Also, aperture ratio means the ratio of the total area of through holes to the cross-sectional area of a honeycomb filter in a cross-section. FIG. 2 shows a preferred range for the A/B value, the ratio between ratio A and ratio B, and the aperture ratio C. The honeycomb filter 10 satisfies Formula (1) after supporting a catalyst. It is noted that in the case of using the filter without supporting a catalyst, it is necessary to satisfy Formula (1) with no catalyst being supported thereon. The honeycomb filter 10 may preferably further satisfy $2.5 \times A/B + 55.5 \leq C$; Formula (2). In this range, it is possible to further reduce pressure loss. The honeycomb filter 10 may preferably further satisfy $C \leq 2.5 \times A/B + 58.0$; Formula (3). In this range, it is possible to further improve the PM filtering efficiency. The aperture ratio C may preferably be about 58 to about 75%. When the aperture ratio is about 58% or more, the pressure loss does not increase relatively, while when the aperture ratio is about 75% or less, the amount of the base material does not decrease and strength of the filter is adequately maintained.

The porosity of the honeycomb filter 10 may preferably be about 30 to about 80%, and more preferably about 40 to about 60%. When the porosity is about 30% or more, the pressure loss does not easily increase, while when the porosity is about 80% or less, the strength of the filter is adequately maintained. In the honeycomb filter 10, the ratio A is arranged to be about 20% or less. When the ratio A is about 20% or less, the ratio of pores with a small pore diameter does not increase, and therefore the pressure loss is not easily increased. Also, the ratio B is arranged to be within the range of 0 to about 20% (not including zero). When the ratio B is about 20% or less, the ratio of pores with a large pore diameter does not increase, and therefore the PM filtering efficiency is preferably not decreased. That is, in order to reduce pressure loss as well as improve the PM filtering efficiency, it is preferred that the ratio of pores with a pore diameter within the range of about 10 to about 30 μm is about 60% or more. It is also preferred that the A/B value is 0 to about 10 (not including zero), and more preferably about 3 or less. It is further preferred that the average pore diameter of the honeycomb filter 10 is about 10 to about 30 μm.

The thickness (wall thickness) of the wall part 15 between through holes 12 formed in the honeycomb filter 10 may preferably be within the range of about 0.15 to about 0.40 mm. When the wall thickness is about 0.15 mm or more, the strength of the filter is adequately maintained, while when the wall thickness is about 0.40 mm or less, exhaust gas easily passes through the wall part 15 and the pressure loss is not easily increased. Also, the number of through holes 12 per unit cross-sectional area (cell density) may preferably be about 31 to about 78 pcs/cm² (about 200 to about 500 cpsi). When the number of through holes is about 31 pcs/cm² or more, the filtration area does not decrease, while when the number of through holes is about 78 pcs/cm² or less, the pressure loss does not increase and it becomes easier to make the honeycomb filter 10. It is noted that the shape of the through holes 12 may be rectangular, triangular, or hexagonal.

The honeycomb filter 10 is made mainly of silicon carbide. It is noted that the honeycomb filter 10 may be mainly made of, for example, silicon nitride, alumina, silica, zirconia, cordierite, mullite, or aluminum titanate.

In addition, the honeycomb filter 10 supports platinum, a noble metal, as a catalyst. It is preferable to arrange the amount of supported catalyst in such a manner that the weight of the catalyst per unit volume of the honeycomb filter 10 is about 0.1 to about 8 g/L. It is noted that the honeycomb filter 10 may be used for the filtering of PMs with no catalyst being supported thereon.

Next, described is a method of manufacturing the honeycomb filter 10 according to the present invention for each process. The description now regards a method of manufacturing the honeycomb filter 10 using mainly silicon carbide. The silicon carbide used here is a mixture of coarse particles (hereinafter referred to as "coarse-grained silicon carbide") with a predetermined average particle size and fine particles (hereinafter referred to as "fine silicon carbide") with an average particle size smaller than the predetermined average particle size. It is noted that fine silicon carbide may have a different crystal form from that of a coarse-grained one.

Average particle size in the present specification means a value obtained by the laser diffraction and scattering method using a Mastersizer Micro manufactured by MALVERN Corporation.

(1) Raw Material Mixing Process

The coarse-grained silicon carbide contained in the raw material of honeycomb filters is to have an average particle size within the range of about 5 to about 100 μm (about 5 to about 50 μm preferably), while the fine silicon carbide is to have an average particle size within the range of about 0.1 to about 5 μm (about 0.1 to about 3 μm preferably). The coarse-grained silicon carbide has an average particle size about 5 to about 100 times greater than that of the fine silicon carbide. The raw material may preferably be compounded so that the ratio of the amount of coarse-grained silicon carbide to the whole silicon carbide is about 60 to about 80 wt %, while the amount of fine silicon carbide about 20 to about 40 wt %.

Next, hole-making agent may be mixed by about 20 parts by weight or less with 100 parts by weight of a mixture of the foregoing coarse-grained silicon carbide and fine silicon carbide. As such a hole-making agent one or more kinds of materials selected among, for example, balloon as a minute hollow sphere mainly made of oxide ceramics, spherical acryl particle, and graphite can be used. As such an oxide balloon here one or more kinds of balloons selected among, for example, aluminum balloon, glass micro-balloon, Shirasu balloon, fly ash balloon, and mullite balloon can be used. It is noted that the amount of the hole-making agent added (including the case of amount as zero) will be chosen appropriately in accordance with the porosity of the honeycomb filter 10 to be obtained. Subsequently, water is to be added and mixed by about 10 to about 35 parts by weight with 100 parts by weight of a mixture of the coarse-grained silicon carbide and fine silicon carbide to obtain a ceramic powder raw materials. It is noted that as dispersion medium, for example, organic solvent (e.g. benzene) and alcohol (e.g. methanol) other than water can be used. The ceramic powder raw materials may be added appropriately with organic binder and/or molding agent other than those above in accordance with the moldability. As such an organic binder one or more kinds of organic binders selected among, for example, methylcellulose, carboxymethylcellulose, hydroxyethylcellulose, polyethyleneglycol, phenol resin, and epoxy resin can be used. The organic binder may preferably be compounded so as to be about 1 to about 12 parts by weight for 100 parts by weight of a mixture of the coarse-grained silicon carbide and fine silicon carbide. As such a molding agent, for example, ethylene glycol, dextrin, fatty acid, fatty-acid soap, and polyalcohol can be used. The ceramic powder raw materials may be mixed using, for example, a mixer or a ball mill, or may be kneaded using a kneader, etc.

(2) Molding and Firing Process

Next, the ceramic powder raw materials containing coarse-grained silicon carbide and fine silicon carbide obtained in the raw material mixing process is to be molded into a honeycomb shape. The ceramic powder raw materials can be molded through extrusion molding, cast molding, or press molding, etc., and here employed is extrusion molding. It is possible to mold honeycomb filters into any shape and size, for example, a cylindrical shape, a rectangular pillar shape, or an elliptic pillar shape. Here, it is to be molded into a rectangular pillar shape with a plurality of through holes extending in parallel longitudinally formed therein. Also, the aperture ratio, wall thickness, and cell density, etc., may be chosen appropriately within the foregoing range in accordance with the intended use. The shape of the through holes 12 may also be rectangular, triangular, orhexagonal. Here, when making a honeycomb filter 10 with a small A/B value, it is preferable to reduce the aperture ratio C within the range of satisfying Formula (1) for the reason that there are many large pores and thus the PM filtering efficiency is likely to decrease. As a method of reducing the aperture ratio C, for example, increasing the cell density, increasing the thickness of the wall part 15, or increasing the cell density as well as increasing the wall thickness can be used. Meanwhile, when making a honeycomb filter 10 with a large A/B value, it is preferable to increase the aperture ratio C within the range of satisfying Formula (1) for the reason that there are many small pores and thus exhaust gas is likely to have a difficulty in passing through the wall. As a method of increasing the aperture ratio C, for example, reducing the cell density, reducing the wall thickness, or reducing the cell density as well as reducing the wall thickness can be used. Then, the raw molded body obtained is to be dried. The drying operation is to be performed at a temperature of about 100 to about 200° C. using a microwave dryer or a hot-air dryer, etc. Then, only one end face of each of a plurality of through holes 12 is to be sealed by forming a plugging part 14 using paste having the same composition as that of the ceramic powder raw materials to dry the filter again. To be more concrete, a plurality of through holes 12 are arranged in such a manner that through holes 12 with one end face being sealed while the other end face being opened and through holes 12 with one end face being opened while the other end face being sealed are disposed alternately.

Next, the raw molded body obtained is to be fired. In the case where an organic constituent such as an organic binder has been added in the raw material mixing process, it is preferable to calcinate before the firing process to degrease the organic constituent. The calcinations takes a condition of, for example, heating at about 300 to about 650° C. under oxygen atmosphere, though chosen appropriately in accordance with the amount and type of the organic constituent added. The molded body is to be fired under a condition of, for example, about 1500 to about 2300° C. (about 1900 to about 2200° C. more preferably) under an inert gas atmosphere such as nitrogen or argon. This allows a honeycomb structure made of silicon carbide (i.e. honeycomb filter 10 before supporting a catalyst) to be obtained.

(3) Catalyst Supporting Process

Subsequently, platinum is to be supported on the obtained honeycomb structure as a catalyst. The catalyst may be supported on a coated layer with alumina coated thereon as a catalyst support provided in the wall part 15. As a method of supporting the catalyst, for example, the impregnation method can be used. It is noted that alumina with a catalyst given thereto may be supported on the honeycomb filter 10. Slurry for the coated layer is first to be fabricated, and the honeycomb structure is to be immersed in the slurry and then pulled out to aspirate and remove unnecessary slurry left in the through holes 12, etc. The structure is then to be dried at about 80 to about 200° C. and fired at about 500 to about 700° C. to provide a coated layer. Next, the honeycomb structure is to be immersed in solution containing a catalyst and then to be dried, and subsequently be fired at about 500 to about 700° C. to obtain a honeycomb filter 10 with platinum supported thereon. Although the amount of supported catalyst may be chosen appropriately in accordance with the intended use, the coated layer here is formed so that the amount of alumina as a catalyst support per unit volume of the honeycomb filter 10 is about 50 to about 120 g/L, while the amount of platinum as supported catalyst per unit volume of the honeycomb filter 10 is about 0.1 to about 8.0 g/L. It is noted that noble metals (e.g. palladium, rhodium) or oxides (e.g. one having a perovskite structure (e.g. $LaCoO_3$, $LaMnO_3$ and $CeO_2$)) as an oxidation catalyst may be supported, or alkali metals (e.g. potassium) or alkaline-earth metals (e.g. barium), etc., as NOx storage catalyst may be supported. The honeycomb filter 10 can trap PMs and can convert NOx, HC, CO, etc., contained in exhaust gas.

Figure 3:
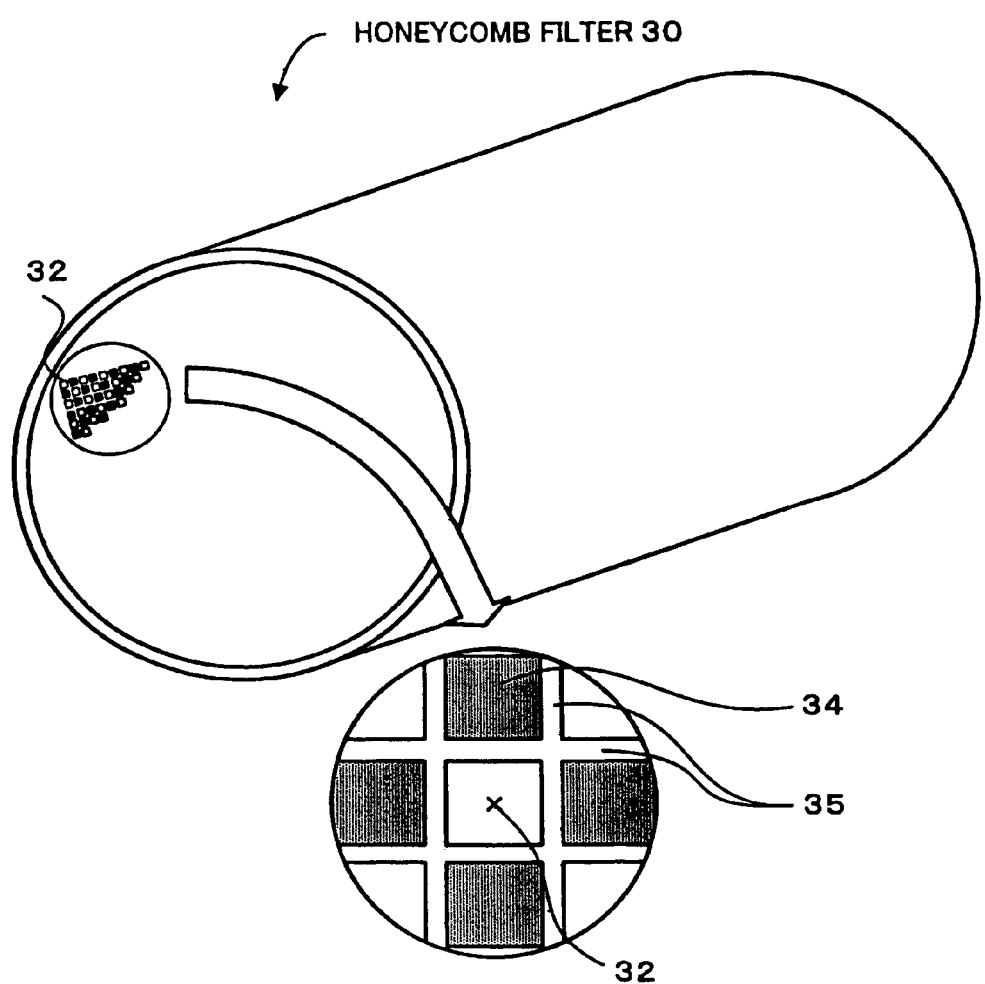
FIG. 3 is an illustrative view of a honeycomb filter 30 according to the present embodiment.
Figure 4:
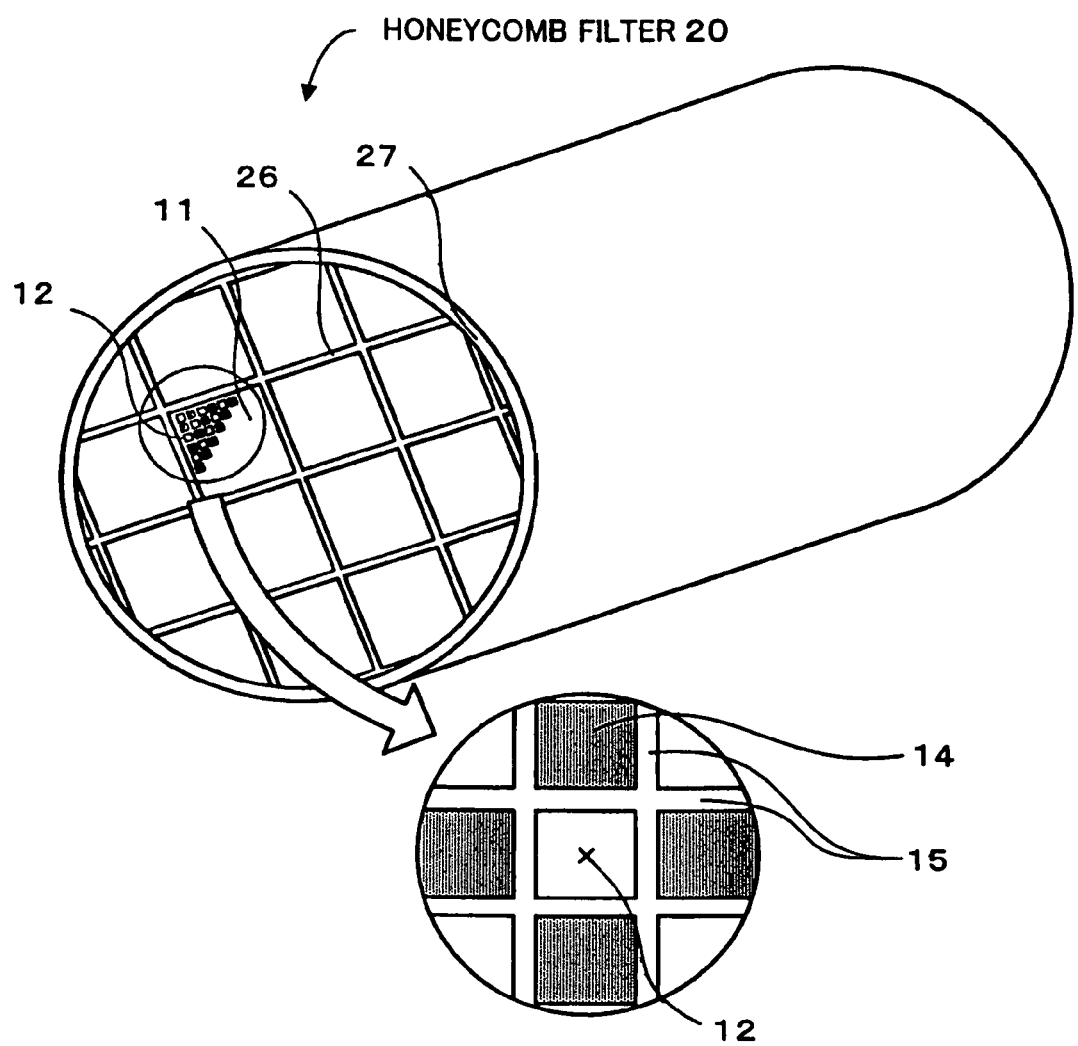
FIG. 4 is an illustrative view of a honeycomb filter 20 according to the present embodiment.

Although the method of manufacturing the honeycomb filter 10 that is molded integrally in a rectangular pillar shape has been described, a honeycomb filter 30 formed in a cylindrical shape as shown in FIG. 3 may be employed. In the honeycomb filter 30, the end face of the through holes 32 is sealed alternately using a plugging part 34. Or, a honeycomb filter 20 (filter assembly according to the present invention) obtained by joining a plurality of honeycomb filters 10 as a honeycomb unit 11 and fabricating the unit in a cylindrical shape as shown in FIG. 4 may be employed. The honeycomb filter 20 comprises: a plurality of honeycomb units 11 formed in a rectangular pillar shape and having a plurality of through holes 12 extending in parallel longitudinally; a sealing material layer 26 for joining the honeycomb units 11 on the outer surface 13 thereof with no through hole 12 opened therein; and a coating material layer 27 for coating the outer peripheral surface with no through-hole 12 opened therein among two or more honeycomb units 11 joined via the sealing material layer 26. It is noted that the coating material layer 27 may not be provided.

The description now regards a method of manufacturing the honeycomb filter 20. A plurality of such honeycomb filters 10 are first to be made as a honeycomb unit 11, and sealing material is to be applied to the outer surface 13 of the honeycomb unit 11 to join a plurality of honeycomb units 11 together, and then the sealing material is to be dried and solidified at about 120° C. to form a sealing material layer 26. Here, it is here preferred that the ratio of the total cross-sectional area of the honeycomb units 11 to the cross-sectional area of the honeycomb filter 20 is about 85% or more, and more preferably about 90% or more. When the ratio of the total cross-sectional area is about 85% or more, the cross-sectional area of those other than the honeycomb filters 10 such as the sealing material layer 26 and the coating material layer 27 does not increase, and the pressure loss is not easily increased. Next, the thus joined units are to be cut into a cylindrical shape using a diamond cutter, etc., and the outer peripheral surface with no through hole 12 opened therein is to be coated using coating material, and then dried and solidified at 120° C. to form a coating material layer 27. Subsequently, the catalyst may be supported after coating the catalyst support, as is the case with the honeycomb filter 10. Thus, a honeycomb filter 20 can be obtained. Here, as such sealing material and/or coating material a material containing at least one of either inorganic fiber or inorganic particle with inorganic binder and/or organic binder added thereto appropriately can be used. As such an inorganic fiber one or more kinds of ceramic fibers selected among, for example, silica-alumina, mullite, alumina, and silica can be used. As such an inorganic particle one or more kinds of particles selected among, for example, silicon carbide, silicon nitride, and boron nitride can be used. As such an inorganic binder one or more kinds of binders selected among, for example, silica sol and alumina sol can be used. As such an organic binder one or more kinds of binders selected among, for example, polyvinyl alcohol, methylcellulose, ethylcellulose, and carboxymethylcellulose can be used. In the honeycomb filter 20, since two or more honeycomb filters 10 are joined via the sealing material layer 26 on the outer surface 13 thereof with no through hole 12 opened therein, it is possible to increase the strength against thermal shock and vibration.

In accordance with the thus closely described honeycomb filter 10 according to the present embodiment, since 2.5×A/B+52.5≦C≦2.5×A/B+60.2 (A≦about 20, 0<B≦about 20); Formula (1) is satisfied, it is possible to reduce pressure loss as well as filter PMs sufficiently. Since 2.5×A/B+55.5≦C is also satisfied, it is possible to further reduce pressure loss. Since C≦2.5×A/B+58.0 is further satisfied, it is possible to further improve the PM filtering efficiency. Furthermore, since the aperture ratio is about 58 to about 75%, the pressure loss does not increase relatively, and therefore the strength is not likely to be reduced.

It will be appreciated that the present invention is not restricted to the above-described embodiment, and various modifications may be made without departing from the technical scope of the present invention.

EXAMPLES

Examples practically manufacturing honeycomb filters 10 are hereinafter described.

Example 1

6720 parts by weight of □-silicon carbide powder (with an average particle size of 22 μm) as coarse-grained silicon carbide, 2880 parts by weight of □-silicon carbide powder (with an average particle size of 0.5 um) as fine silicon carbide, 980 parts by weight of acryl particle (with an average particle size of 20 μm) as hole-making agent, and 2970 parts by weight of water were first mixed, and then 1050 parts by weight of methylcellulose as an organic binder, 500 parts by weight of glycerin as a plasticizer, and 230 parts by weight of lubricant (Trade name UNILUBE; manufactured by NOF Corporation) were added thereto and kneaded to obtain ceramic powder raw materials. The raw materials, the average particle size of each raw material, and the blending quantity of the honeycomb filter 10, etc., in the Example 1 are summarized in Table 1. The details related to the Examples 2 to 34 to be described hereinafter are also summarized in Table 1. Next, the ceramic powder raw materials were subjected to extrusion molding using an extrusion molding machine to be a rectangular pillar shape with a plurality of through holes 12 extending in parallel longitudinally formed therein, and thereby to obtain a raw molded body having a shape of a honeycomb filter 10 with no plugging part 14 formed therein. The raw molded body obtained was then dried using a microwave dryer or a hot-air dryer, and each of the plurality of through holes 12 was sealed by forming a plugging part 14 using paste having the same composition as that of the ceramic powder raw materials in such a manner that through holes 12 with one end face being sealed while the other end face being opened and through holes 12 with one end face being opened while the other end face being sealed are disposed alternately. Then, the molded body was further dried and degreased at 400° C. for 3 hours. The molded body was fired at 2200° C. for 3 hours under a normal-pressure argon atmosphere to make a honeycomb structure (refer to FIG. 1) made of silicon carbide, having a size of 34.3 mm×34.3 mm×150 mm, including through holes at 46.5 pcs/cm² (300 cpsi), having a thickness of the wall part 15 of 0.43 mm, and having an aperture ratio of the plane perpendicular to the through holes 12 of 50%.

TABLE 1

| | Coarse-grained SiC | | Fine SiC | | Acrylic particle | | Methyl- | | | |
| --- | --- | --- | --- | --- | --- | --- | --- | --- | --- | --- |
| Sample | Diameter μm | Quantity Part by weight | Diameter μm | Quantity Part by weight | Diameter μm | Quantity Part by weight | cellulose Part by weight | Water Part by weight | Plasticizer Part by weight | Lubricant Part by weight |
| Examples 1-5 | 22 | 6720 | 0.5 | 2880 | 20 | 980 | 1050 | 2970 | 500 | 230 |
| Examples 6-10 | 11 | 6720 | 0.5 | 2880 | 60 | 980 | 1050 | 2970 | 500 | 230 |
| Examples 11-15 | 11 | 6720 | 0.5 | 2880 | 40/60 | 490/490 | 1050 | 2970 | 500 | 230 |
| Examples 16-20 | 22 | 4550 | 0.5 | 1950 | 40 | 1060 | 550 | 1500 | 330 | 150 |
| Examples 21-25 | 40 | 4550 | 0.5 | 2880 | 40/60 | 530/530 | 550 | 1500 | 330 | 150 |
| Examples 26-30 | 22 | 4550 | 0.5 | 2880 | 20/40 | 530/530 | 550 | 1500 | 330 | 150 |
| Examples 31, 32 | 30 | 4550 | 0.5 | 1950 | 60 | 1060 | 550 | 1500 | 330 | 150 |
| Examples 33, 34 | 50 | 6720 | 0.5 | 2880 | 40 | 980 | 1050 | 2970 | 500 | 230 |

Next, platinum was supported on the honeycomb structure as a catalyst. 100 parts by weight of activated alumina powder (with an average particle size of 2 μm) and 200 parts by weight of water were first mixed, and then 20 parts by weight of nitric acid was added thereto to fabricate slurry for coating. The honeycomb structure was immersed in the slurry and then pulled out to remove unnecessary slurry, and was subsequently dried at 250° C. for 15 minutes. The amount of supported alumina was arranged in such a manner as to have a weight of 80 g/L per unit volume of the honeycomb filter 10. Next, 0.25 mol/L of platinum nitrate solution was prepared, and the honeycomb structure was allowed to absorb the platinum nitrate solution so that the amount of supported platinum is arranged in such a manner as to have a weight of 3.0 g/L per unit volume of the honeycomb filter 10, and then fired at 600° C. for 1 hour. Thus, a honeycomb filter 10 shown in FIG. 1 was obtained.

The aperture ratio C, the wall thickness of the wall part 15 and the cell density, etc., of the honeycomb filter 10 in the Example 1 are summarized in Table 2. The details related to the Examples 2 to 34 to be described hereinafter are also summarized in Table 2. In addition, the ratio A of pore volume of pores with a pore diameter of 10 μm or less to the total pore volume, the ratio B of pores with a pore diameter of 30 μm or more to the total pore volume, and the A/B value are also summarized in Table 2 as evaluation results to be described hereinafter.

materials to be the blending quantity shown in Table 1 and for designing the aperture ratio C, wall thickness, and cell density as shown in Table 2.

Measurement of Pore Diameter and Porosity

The pore diameter and porosity were measured in the Examples 1 to 34. This measurement was performed by mercury porosimetry based on JIS-R1655 using AutoPore III 9405, an automatic porosimeter manufactured by SHIMADZU Corporation, as a measuring instrument. The entire contents of JIS-R1655 are incorporated by reference herein. To be more concrete, a part including no plugging part 14 of the honeycomb filter 10 was cut into a cube about 0.8 cm on a side, cleaned by ultrasonic wave using ion-exchanged water and dried, and then provided for measurement using the measuring instrument within the measuring range of 0.1 to 360 μm. The measurement was performed for every pressure of 0.1 psia within the range of 100 to 360 μm, while of 0.25 psia within the range of 0.1 to 100 μm. It is noted that in this measurement, the measuring of pressure loss, and the measuring of the PM filtering efficiency was used a honeycomb filter 10 after supporting catalyst support (alumina) and catalyst (platinum) as a coated layer.

Measurement of Pressure Loss

Figure 5:
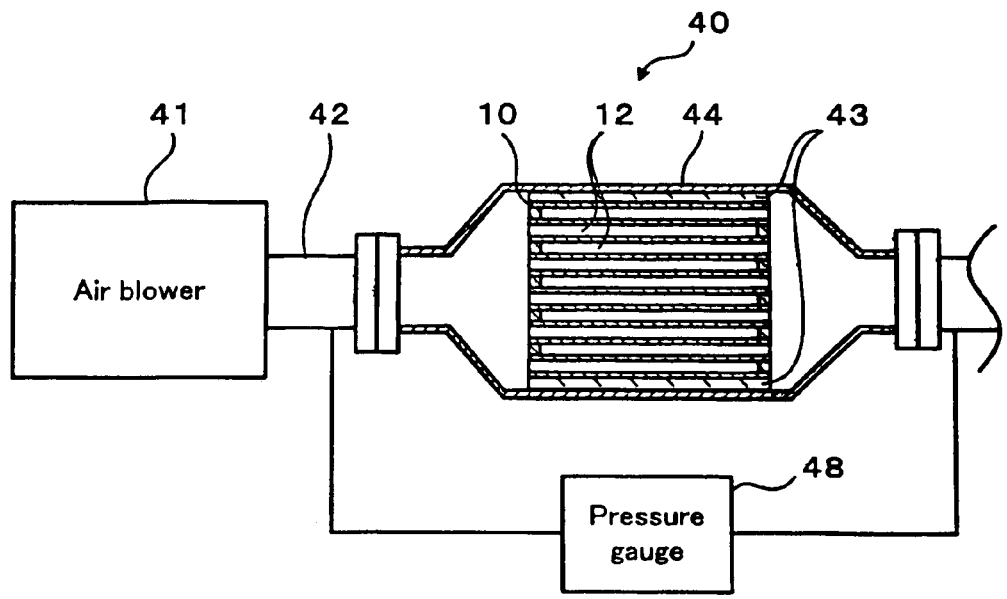
FIG. 5 is an illustrative view of a pressure loss measuring apparatus 40.

The pressure loss in the honeycomb filter 10 was measured in the Examples 1 to 34. FIG. 5 is an illustrative view of a pressure loss measuring apparatus 40. In the pressure

TABLE 2

| Sample | Volume ratio of 10 μm or less A(%) | Volume ratio of 30 μm or more B(%) | Value A/B | Aperture ratio C (%) | Wall thickness (mm) | Cell density (cpsi) | Cell density (cell/cm²) |
|---|---|---|---|---|---|---|---|
| Example 1 | 0.5 | 17.1 | 0.03 | 50.0 | 0.43 | 300 | 46.5 |
| Example 2 | 0.5 | 17.1 | 0.03 | 52.9 | 0.40 | 300 | 46.5 |
| Example 3 | 0.5 | 17.1 | 0.03 | 58.0 | 0.35 | 300 | 46.5 |
| Example 4 | 0.5 | 17.1 | 0.03 | 60.1 | 0.33 | 300 | 46.5 |
| Example 5 | 0.5 | 17.1 | 0.03 | 60.4 | 0.40 | 200 | 31.0 |
| Example 6 | 8.2 | 16.3 | 0.50 | 52.9 | 0.40 | 300 | 46.5 |
| Example 7 | 8.2 | 16.3 | 0.50 | 54.8 | 0.33 | 400 | 62.0 |
| Example 8 | 8.2 | 16.3 | 0.50 | 58.0 | 0.35 | 300 | 46.5 |
| Example 9 | 8.2 | 16.3 | 0.50 | 60.4 | 0.40 | 200 | 31.0 |
| Example 10 | 8.2 | 16.3 | 0.50 | 63.3 | 0.30 | 300 | 46.5 |
| Example 11 | 16.6 | 19.9 | 0.83 | 52.9 | 0.40 | 300 | 46.5 |
| Example 12 | 16.6 | 19.9 | 0.83 | 54.9 | 0.38 | 300 | 46.5 |
| Example 13 | 16.6 | 19.9 | 0.83 | 60.1 | 0.33 | 300 | 46.5 |
| Example 14 | 16.6 | 19.9 | 0.83 | 61.2 | 0.35 | 250 | 38.8 |
| Example 15 | 16.6 | 19.9 | 0.83 | 63.3 | 0.30 | 300 | 46.5 |
| Example 16 | 16.0 | 10.8 | 1.48 | 54.9 | 0.38 | 300 | 46.5 |
| Example 17 | 16.0 | 10.8 | 1.48 | 56.4 | 0.40 | 250 | 38.8 |
| Example 18 | 16.0 | 10.8 | 1.48 | 60.1 | 0.33 | 300 | 46.5 |
| Example 19 | 16.0 | 10.8 | 1.48 | 63.3 | 0.30 | 300 | 46.5 |
| Example 20 | 16.0 | 10.8 | 1.48 | 64.5 | 0.25 | 400 | 62.0 |
| Example 21 | 19.9 | 10.9 | 1.83 | 56.4 | 0.40 | 250 | 38.8 |
| Example 22 | 19.9 | 10.9 | 1.83 | 58.0 | 0.35 | 300 | 46.5 |
| Example 23 | 19.9 | 10.9 | 1.83 | 60.4 | 0.40 | 200 | 31.0 |
| Example 24 | 19.9 | 10.9 | 1.83 | 64.5 | 0.25 | 400 | 62.0 |
| Example 25 | 19.9 | 10.9 | 1.83 | 65.5 | 0.28 | 300 | 46.5 |
| Example 26 | 16.1 | 7.1 | 2.27 | 58.0 | 0.35 | 300 | 46.5 |
| Example 27 | 16.1 | 7.1 | 2.27 | 58.3 | 0.30 | 400 | 62.0 |
| Example 28 | 16.1 | 7.1 | 2.27 | 63.3 | 0.30 | 300 | 46.5 |
| Example 29 | 16.1 | 7.1 | 2.27 | 65.5 | 0.28 | 300 | 46.5 |
| Example 30 | 16.1 | 7.1 | 2.27 | 68.8 | 0.25 | 300 | 46.5 |
| Example 31 | 21.0 | 10.0 | 2.10 | 60.4 | 0.40 | 200 | 31.0 |
| Example 32 | 21.0 | 10.0 | 2.10 | 63.3 | 0.30 | 300 | 46.5 |
| Example 33 | 9.4 | 22.6 | 0.42 | 56.2 | 0.45 | 200 | 31.0 |
| Example 34 | 9.4 | 22.6 | 0.42 | 58.0 | 0.35 | 300 | 46.5 |

Examples 2 to 34

Honeycomb filters 10 of the Examples 2 to 34 were made in the same way as the Example 1 except for mixing raw loss measuring apparatus 40, a honeycomb filter 10 covered with an aluminum mat 43 and fixed inside a metal casing 44 is arranged in an exhaust gas pipe 42 of an air blower 41, and a pressure gauge 48 is installed so that the pressure before and after the honeycomb filter 10 can be detected. The air blower 41 is operated so that the amount of exhaust gas distribution is 750 m³/h, and the pressure loss was measured from the differential pressure 5 minutes after the starting of the operation.

Measurement of PM Filtering Efficiency

Figure 6:
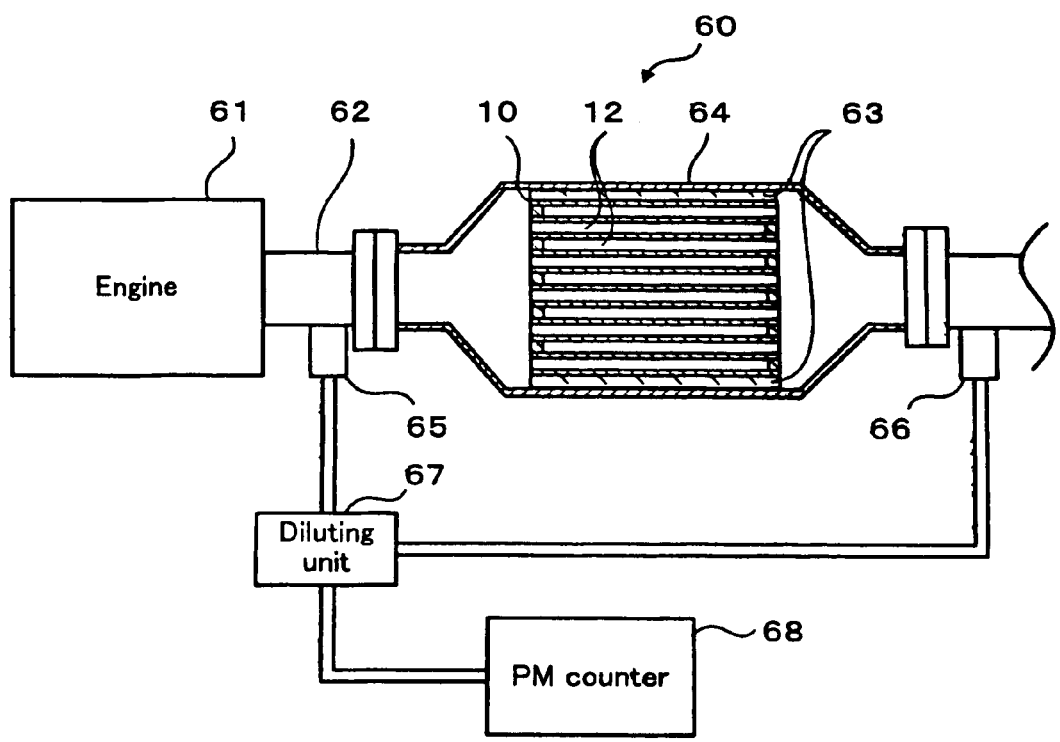
FIG. 6 is an illustrative view of an exhaust gas purification measuring apparatus 60.

The PM filtering efficiency contained in exhaust gas was measured in the Examples 1 to 34. FIG. 6 is an illustrative view of an exhaust gas purification measuring apparatus 60. The exhaust gas purification measuring apparatus 60 is constructed as a Scanning Mobility Particle Sizer (SMPS) comprising: a 2 L common rail diesel engine 61; an exhaust gas pipe 62 for distributing exhaust gas from the engine 61; a metal casing 64 connected to the exhaust gas pipe 62 to fix a honeycomb filter 10 covered with an aluminum mat 63; a sampler 65 for sampling exhaust gas before being distributed into the honeycomb filter 10; a sampler 66 for sampling exhaust gas after being distributed into the honeycomb filter 10; a diluting unit 67 for diluting exhaust gas sampled by the samplers 65 and 66; and a PM counter 68 (aggregated particles counter 3022A-S manufactured by TSI Corporation) for measuring the amount of PMs contained in the thus diluted exhaust gas. Next, described is a measuring procedure. The engine 61 was operated at an engine speed of 2000 rpm and a torque of 47 Nm, and exhaust gas from the engine 61 was distributed into the honeycomb filter 10. In this case, the amount of PMs "P0" before passing through the honeycomb filter 10 and the amount of PMs "Pi" after passing through the honeycomb filter 10 were grasped from the number of PMs using the PM counter 68. Then, the PM filtering efficiency contained in exhaust gas was obtained from the following Formula (4).

Filtering Efficiency (%)=(P0−Pi)/P0×100;   Formula (4)

Experimental Results

Figure 7:
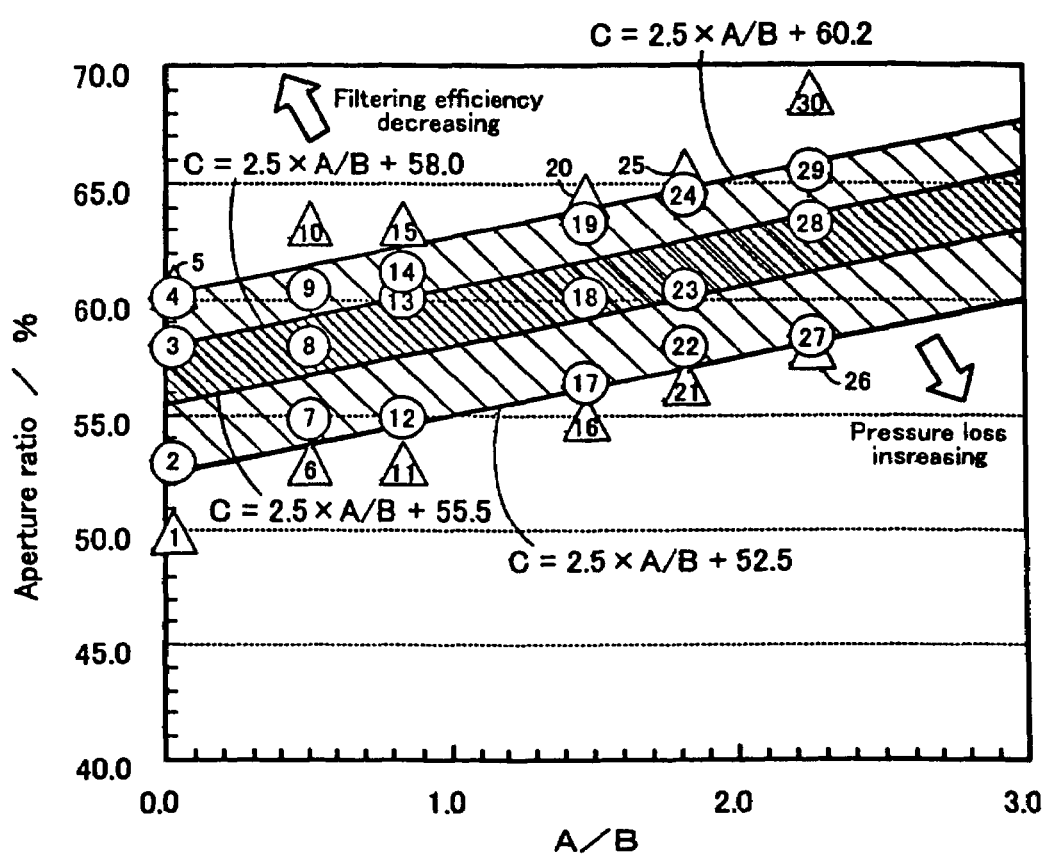
FIG. 7 is a graph showing the relationship between the A/B value and the aperture ratio.

Table 3 summarizes the A/B value as experimental results of the Examples 1 to 34, the lower limit Cmin and upper limit Cmax of the aperture ratio C obtained from the A/B value using Formula (1), and the aperture ratio C, average pore diameter, porosity, pressure loss and PM filtering efficiency of the honeycomb filter 10. FIG. 7 is a graph showing the relationship between the A/B value and the aperture ratio C, where the Examples 1 to 30 (samples with a ratio A of 20% or less and a ratio B of 20% or less) are plotted using the horizontal axis as the A/B value, while the vertical axis as the aperture ratio C. It is noted that in FIG. 7, samples included within the range of Formula (1) are plotted in a circular shape, while samples not included within the range of Formula (1) are plotted in a triangular shape, where the number of each Example is given for each point. As is clear from Table 3, the samples with a ratio A of more than 20% (Examples 31 and 32) exhibit a large pressure loss, while the samples with a ratio B of more than 20% (Examples 33 and 34) exhibit a small PM filtering efficiency. Next, as is clear from Table 3 and FIG. 7, in the samples of the Examples 2 to 4, 7 to 9, 12 to 14, 17 to 19, 22 to 24, and 27 to 29, that is, those included within the preferred range shown in FIG. 2 (satisfying Formula (1)), the pressure loss is 13 kPa or less and the PM filtering efficiency is 80% or more, that is, it is possible to reduce pressure loss as well as filter PMs sufficiently. In the case of an aperture ratio C of 54% or more, the pressure loss is found to be relatively small. Also, in the samples of the Examples 3 to 4, 8 to 9, 13 to 14, 18 to 19, 23 to 24, and 28 to 29, that is, those satisfying $2.5 \times A/B + 55.5 \leq C$, the pressure loss has an even smaller value. Further, in the samples of the Examples 2, 7 to 8, 12 to 13, 17 to 18, 22 to 23, and 27 to 28, that is, those satisfying $C \leq 2.5 \times A/B + 58.0$, the PM filtering efficiency has an even greater value. In particular, the Examples 8, 13, 18, 23, and 28 existing within the range of $2.5 \times A/B + 55.5 \leq C \leq 2.5 \times A/B + 58.0$ exhibit the best balance between pressure loss and PM filtering efficiency.

TABLE 3

| Sample | Value A/B | Lower limit of aperture ratio[1] Cmin | Upper limit of aperture ratio[2] Cmax | Aperture ratio C (%) | Average pore diameter (μm) | Porosity (%) | Pressure loss (kPa) | PM Filtering Ratio (%) |
|---|---|---|---|---|---|---|---|---|
| Example 1 | 0.03 | 52.6 | 60.3 | 50.0 | 20.8 | 58.1 | 13.6 | 92 |
| Example 2 | 0.03 | 52.6 | 60.3 | 52.9 | 20.8 | 58.1 | 12.8 | 90 |
| Example 3 | 0.03 | 52.6 | 60.3 | 58.0 | 20.8 | 58.1 | 12.4 | 84 |
| Example 4 | 0.03 | 52.6 | 60.3 | 60.1 | 20.8 | 58.1 | 12.2 | 80 |
| Example 5 | 0.03 | 52.6 | 60.3 | 60.4 | 20.8 | 58.1 | 12.2 | 76 |
| Example 6 | 0.50 | 53.8 | 61.5 | 52.9 | 20.0 | 60.0 | 13.7 | 90 |
| Example 7 | 0.50 | 53.8 | 61.5 | 54.8 | 20.0 | 60.0 | 12.8 | 89 |
| Example 8 | 0.50 | 53.8 | 61.5 | 58.0 | 20.0 | 60.0 | 12.5 | 86 |
| Example 9 | 0.50 | 53.8 | 61.5 | 60.4 | 20.0 | 60.0 | 12.3 | 82 |
| Example 10 | 0.50 | 53.8 | 61.5 | 63.3 | 20.0 | 60.0 | 12.1 | 73 |
| Example 11 | 0.83 | 54.6 | 62.3 | 52.9 | 19.8 | 57.6 | 13.8 | 93 |
| Example 12 | 0.83 | 54.6 | 62.3 | 54.9 | 19.8 | 57.6 | 12.9 | 90 |
| Example 13 | 0.83 | 54.6 | 62.3 | 60.1 | 19.8 | 57.6 | 12.6 | 86 |
| Example 14 | 0.83 | 54.6 | 62.3 | 61.2 | 19.8 | 57.6 | 12.4 | 84 |
| Example 15 | 0.83 | 54.6 | 62.3 | 63.3 | 19.8 | 57.6 | 12.2 | 76 |
| Example 16 | 1.48 | 56.2 | 63.9 | 54.9 | 18.1 | 58.7 | 13.4 | 90 |
| Example 17 | 1.48 | 56.2 | 63.9 | 56.4 | 18.1 | 58.7 | 13.0 | 90 |
| Example 18 | 1.48 | 56.2 | 63.9 | 60.1 | 18.1 | 58.7 | 12.4 | 86 |
| Example 19 | 1.48 | 56.2 | 63.9 | 63.3 | 18.1 | 58.7 | 12.3 | 82 |
| Example 20 | 1.48 | 56.2 | 63.9 | 64.5 | 18.1 | 58.7 | 12.2 | 78 |
| Example 21 | 1.83 | 57.1 | 64.8 | 56.4 | 17.9 | 57.9 | 13.5 | 92 |
| Example 22 | 1.83 | 57.1 | 64.8 | 58.0 | 17.9 | 57.9 | 12.8 | 92 |
| Example 23 | 1.83 | 57.1 | 64.8 | 60.4 | 17.9 | 57.9 | 12.6 | 88 |
| Example 24 | 1.83 | 57.1 | 64.8 | 64.5 | 17.9 | 57.9 | 12.4 | 82 |
| Example 25 | 1.83 | 57.1 | 64.8 | 65.5 | 17.9 | 57.9 | 12.4 | 77 |
| Example 26 | 2.27 | 58.2 | 65.9 | 58.0 | 17.6 | 57.1 | 13.4 | 92 |

TABLE 3-continued

| Sample | Value A/B | Lower limit of aperture ratio[1] Cmin | Upper limit of aperture ratio[2] Cmax | Aperture ratio C (%) | Average pore diameter (μm) | Porosity (%) | Pressure loss (kPa) | PM Filtering Ratio (%) |
|---|---|---|---|---|---|---|---|---|
| Example 27 | 2.27 | 58.2 | 65.9 | 58.3 | 17 6 | 57.1 | 12.8 | 90 |
| Example 28 | 2.27 | 58.2 | 65.9 | 63.3 | 17.6 | 57.1 | 12.4 | 88 |
| Example 29 | 2.27 | 58.2 | 65.9 | 65.5 | 17.6 | 57.1 | 12.3 | 85 |
| Example 30 | 2.27 | 58.2 | 65.9 | 68.8 | 17.6 | 57.1 | 12.1 | 74 |
| Example 31 | 2.10 | 57.8 | 65.5 | 60.4 | 19.6 | 58.4 | 14.1 | 90 |
| Example 32 | 2.10 | 57.8 | 65.5 | 63.3 | 19.6 | 58.4 | 13.6 | 86 |
| Example 33 | 0.42 | 53.5 | 61.2 | 56.2 | 21.7 | 58.9 | 12.4 | 72 |
| Example 34 | 0.42 | 53.5 | 61.2 | 58.0 | 21.7 | 58.9 | 12.1 | 69 |

[1]Calculated by $C_{min} = 2.5 \times A/B + 52.5$
[2]Calculated by $C_{max} = 2.5 \times A/B + 60.2$ Filter Assembly A plurality of honeycomb filters 10 according to the Examples 1 to 34 were made as a honeycomb unit 11, and sealing material was applied to the outer surface 13 of the honeycomb unit 11 to join a plurality of honeycomb units 11 together, and then the sealing material was dried and solidified at 120° C. to form a sealing material layer 26. As the sealing material was used one composed of 30 wt % of alumina fiber (with a fiber length of 20 μm), 21 wt % of silicon carbide particle (with an average particle size of 0.6 μm), 15 wt % of silica sol (30 wt % of silica contained in sol), 5.6 wt % of carboxymethylcellulose, and 28.4 wt % of water. Next, the thus joined units were cut into a cylindrical shape using a diamond cutter, and the outer peripheral surface with no through hole 12 opened therein was coated using coating material, and then dried and solidified at 120° C. to form a coating material layer 27. As the coating material was used one composed of 23.3 wt % of silica-alumina fiber (with a fiber length of 5 to 100 μm), 30.2 wt % of silicon carbide particle (with an average particle size of 0.3 μm), 7 wt % of silica sol (30 wt % of silica contained in sol), 0.5 wt % of carboxymethylcellulose, and 39 wt % of water. Subsequently, the catalyst was supported after coating the catalyst support, as is the case with the honeycomb filter 10. Thus, a honeycomb filter 20 shown in FIG. 3 was obtained. The ratio of the total cross-sectional area of the honeycomb units 11 to the cross-sectional area of the honeycomb filter 20 obtained (unit area ratio) was 93.5%.

The present invention claims priority to Japanese Patent Application No. 2004-382132 filed on Dec. 28, 2004, and International Application No. PCT/JP2005/014861 filed on Aug. 8, 2005, the entire contents of both of which are incorporated herein by reference.

What is claimed is:

1. A filter having a plurality of through holes, satisfying the expression $2.5 \times A/B + 52.5 \leq C \leq 2.5 \times A/B + 60.2$ (A≦about 20, 0<B≦about 20), where A(%) represents the ratio of pores with a pore diameter of about 10 μm or less to the total pore volume in a wall part between the through holes; B(%) represents the ratio of pores with a pore diameter of about 30 μm or more to the total pore volume in the wall part; and C(%) represents the aperture ratio of a plane perpendicular to the through holes.

2. A filter having a plurality of through holes, wherein a wall part between the through holes supports a catalyst, the filter satisfying the expression $2.5 \times A/B + 52.5 \leq C \leq 2.5 \times A/B + 60.2$ (A≦about 20, 0<B≦about 20), where A(%) represents the ratio of pores with a pore diameter of about 10 μm or less to the total pore volume in the wall part; B(%) represents the ratio of pores with a pore diameter of about 30 μm or more to the total pore volume in the wall part; and C(%) represents the aperture ratio of a plane perpendicular to the through holes.

3. The filter according to claim 1 or 2, further satisfying the expression $2.5 \times A/B + 55.5 \leq C$.

4. The filter according to claim 1 or 2, further satisfying the expression $C \leq 2.5 \times A/B + 58.0$.

5. The filter according to claim 1 or 2, wherein the aperture ratio is about 58% or more.

6. The filter according to claim 1 or 2, wherein the aperture ratio is about 75% or less.

7. The filter according to claim 1 or 2, wherein the wall thickness between the through holes is within a range of about 0.15 to about 0.40 mm.

8. The filter according to claim 1 or 2, wherein the cell density is within a range of about 31 to about 78 pcs/cm$^2$.

9. The filter according to claim 1 or 2, including any of silicon carbide, silicon nitride, and cordierite, as a main component.

10. A filter assembly in which two or more filters are joined to each other via a sealing material layer on the outer surface thereof with no through holes opened, wherein
the filter has a plurality of through holes and satisfies the expression $2.5 \times A/B + 52.5 \leq C \leq 2.5 \times A/B + 60.2$ (A≦about 20, 0<B≦about 20), where A(%) represents the ratio of pores with a pore diameter of about 10 μm or less to the total pore volume in a wall part between the through holes; B(%) represents the ratio of pores with a pore diameter of about 30 μm or more to the total pore volume in the wall part; and C(%) represents the aperture ratio of a plane perpendicular to the through holes.

11. A filter assembly in which two or more filters are joined to each other via a sealing material layer on the outer surface thereof with no through holes opened, wherein
the filter has a plurality of through holes and a wall part that supports a catalyst between the through holes, and satisfies the expression $2.5 \times A/B + 52.5 \leq C \leq 2.5 \times A/B + 60.2$ (A≦about 20, 0<B≦about 20), where A(%) represents the ratio of pores with a pore diameter of about 10 μm or less to the total pore volume in the wall part; B(%) represents the ratio of pores with a pore diameter of about 30 μm or more to the total pore volume in the wall part; and C(%) represents the aperture ratio of a plane perpendicular to the through holes.

12. The filter assembly according to claim 10 or 11, wherein the filter further satisfies the expression $2.5 \times A/B + 55.5 \leqq C$.

13. The filter assembly according to claim 10 or 11, wherein the filter further satisfies the expression $C \leqq 2.5 \times A/B + 58.0$.

14. The filter assembly according to claim 10 or 11, wherein the aperture ratio of the filter is about 58% or more.

15. The filter assembly according to claim 10 or 11, wherein the aperture ratio of the filter is about 75% or less.

16. The filter assembly according to claim 10 or 11, wherein the wall thickness between the through holes of the filter is within a range of about 0.15 to about 0.40 mm.

17. The filter assembly according to claim 10 or 11, wherein the cell density of the filter is within a range of about 31 to about 78 pcs/cm$^2$.

18. The filter assembly according to claim 10 or 11, wherein the filter includes any of silicon carbide, silicon nitride, and cordierite, as a main component.

* * * * *